(12) United States Patent
Hruschka et al.

(10) Patent No.: US 12,443,214 B2
(45) Date of Patent: Oct. 14, 2025

(54) PEDAL UNIT FOR CONTROLLING A VEHICLE FUNCTION

(71) Applicant: Robert Bosch GmbH, Stuttgart (DE)

(72) Inventors: Martin Hruschka, Abstatt-Happenbach (DE); Stephan Roeger, Steinheim-Hoepfigheim (DE); Andreas Baumgartner, Auenstein (DE); Guenter Escher, Oberstdorf (DE); Juergen Kissner, Oppenweiler (DE); Manfred Fischer, Oppenweiler (DE); Timo Knecht, Mundelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/641,341

(22) Filed: Apr. 20, 2024

(65) Prior Publication Data

US 2024/0353883 A1 Oct. 24, 2024

(30) Foreign Application Priority Data

Apr. 24, 2023 (DE) ..................... 10 2023 203 730.0

(51) Int. Cl.
*G05G 1/30* (2008.04)
*B60K 26/02* (2006.01)
(Continued)

(52) U.S. Cl.
CPC ............... *G05G 1/38* (2013.01); *B60K 26/02* (2013.01); *B60T 7/042* (2013.01); *G05G 1/42* (2013.01);
(Continued)

(58) Field of Classification Search
CPC .. G05G 1/30; G05G 1/38; G05G 1/42; G05G 5/05; G05G 2505/00; B60K 26/02;
(Continued)

(56) References Cited

U.S. PATENT DOCUMENTS

| 2,831,367 | A | * | 4/1958 | Reilly | ..................... | B60K 26/02 74/513 |
| 6,305,506 | B1 | * | 10/2001 | Shirai | ..................... | B60T 7/042 188/72.3 |
| 12,077,137 | B2 | * | 9/2024 | Prahl | ......................... | G05G 1/40 |

FOREIGN PATENT DOCUMENTS

| DE | 10033297 A1 * | 11/2001 | ........... B60K 26/021 |
| DE | 102 39 913 A1 | 3/2004 | |

(Continued)

*Primary Examiner* — Adam D Rogers
(74) *Attorney, Agent, or Firm* — Maginot, Moore & Beck LLP

(57) ABSTRACT

A pedal unit for controlling a vehicle function is disclosed. The pedal unit includes a tread plate that has a support surface configured to receive an actuating force of a driver's foot. The tread plate is connected to a housing cover that is movable via a small stroke along a vertical direction of the pedal unit. The housing cover is connected to a sensor housing in which at least one sensor arrangement is formed. At least one deflection device is included and designed to deflect a small stroke movement of the movable housing cover extending along a vertical direction of the pedal unit caused by the actuating force into a measuring movement extending along a longitudinal direction of the pedal unit. The at least one sensor arrangement is designed to detect the measuring movement based on the small stroke movement in a contactless manner.

16 Claims, 2 Drawing Sheets

(51) Int. Cl.
  *B60T 7/04* (2006.01)
  *G05G 1/38* (2008.04)
  *G05G 1/42* (2008.04)
  *G05G 5/05* (2006.01)

(52) U.S. Cl.
  CPC ............ *G05G 5/05* (2013.01); *B60T 2220/04* (2013.01); *G05G 2505/00* (2013.01)

(58) Field of Classification Search
  CPC ........ B60T 7/04; B60T 7/042; B60T 2220/04; B60Y 2400/301
  See application file for complete search history.

(56) References Cited

FOREIGN PATENT DOCUMENTS

| | | |
|---|---|---|
| DE | 103 12 547 A1 | 10/2004 |
| DE | 102022212470 A1 * | 5/2024 |
| DE | 102023203734 A1 * | 10/2024 |
| KR | 20120009101 A * | 2/2012 |

* cited by examiner

PEDAL UNIT FOR CONTROLLING A VEHICLE FUNCTION

This application claims priority under 35 U.S.C. § 119 to patent application no. DE 10 2023 203 730.0, filed on Apr. 24, 2023 in Germany, the disclosure of which is incorporated herein by reference in its entirety.

BACKGROUND

The disclosure relates a pedal unit for controlling a vehicle function.

Drive-by-wire system which transmit driver commands only electrically or electronically are known from the prior art. Known examples of such drive-by-wire systems are referred to as electronic accelerator pedals for drive control, a brake-by-wire system for brake control, or a steer-by-wire system for steering control. Drive-by-wire refers to driving or controlling a vehicle without mechanical transmission of power from control elements, such as the accelerator pedal, brake pedal or steering wheel, to the corresponding actuating elements of the vehicle, such as the throttle, brakes and/or steering of the vehicle. In other words, in such drive-by-wire systems, the corresponding pedal unit is decoupled from the power flow, and the aforementioned functions are instead controlled via electrical lines and servo motors or electromechanical actuators. Sensor devices of the drive-by-wire systems conventionally detect a driver specification using force-based sensor units to determine the desired intensity of braking or acceleration of the vehicle and to adjust it accordingly via the powertrain and brake system. Eliminating the mechanical connection makes it possible to implement new pedal concepts, because there is no longer a need for a large pedal travel to achieve vehicle deceleration or vehicle acceleration.

DE 103 12 547 A1 discloses a device for accelerating or decelerating a motor vehicle comprising two actuating elements. A first actuating element is used for accelerating, and a second actuating element is used for decelerating the motor vehicle. The actuating elements are actuated by applying a hand or foot force. The operation of the two actuating elements is largely without travel, and the speed of the motor vehicle is kept constant after the hand or foot force is removed from the first actuating element or from the second actuating element as a function of the most recently applied hand or foot force until the first actuating element or the second actuating element are actuated again.

An actuating means for influencing a brake, clutch, or drive system of a motor vehicle is known from DE 102 39 913 A1. The actuating means actuated by a driver is mechanically decoupled from the actuators of the system. The actuating means in this case is a transducer that detects only the driver's actuating force and generates a control signal, the generation of which is independent of an actuation path and does not have an actuation path.

SUMMARY

The pedal unit for controlling a vehicle function having the features set forth below has the advantage that, by deflecting an actuating movement or stroke movement that travels in the vertical direction of the pedal unit into a measuring movement in the longitudinal direction of the pedal unit, contactless measuring sensor arrangements can be used to measure the path of the small stroke movement of a tread plate or a movable housing cover coupled to the tread plate. Such a contactless path measurement can, e.g., be performed using a magnetic, inductive or even capacitive measuring principle. For this purpose, a corresponding measuring transducer can be moved past a sensor electronics means, which comprises at least one sensor element and, e.g., senses, field changes, inductance changes, etc. The determined path can then be converted into an actuating force, e.g. in a control unit, which the driver exerts on a support surface of the tread plate when the pedal unit is actuated. By deflecting the actuating movement and using the contactless measuring sensor arrangements, a reduction in the construction height of the pedal unit can be implemented. At the same time, a high resolution can be achieved for pedal units having a small stroke.

Embodiments of the present disclosure provide a pedal unit for controlling a vehicle function, having a tread plate which comprises a support surface for receiving an actuating force of a driver's foot and is connected to a housing cover that is movable via a small stroke along a vertical direction of the pedal unit. The housing cover that is movable via a small stroke is connected to a sensor housing, in which at least one sensor arrangement is arranged. The at least one deflection device is designed to deflect a small stroke movement of the movable housing cover caused by the actuating force along the vertical direction of the pedal unit into a measuring movement along a longitudinal direction of the pedal unit. In this case, the at least one sensor arrangement is designed to detect the measuring movement based on the small stroke movement in a contactless manner.

The controllable vehicle function can, e.g., be a braking function or an acceleration function.

In pedal units having a small actuation stroke, the sensor housing is typically fixed. The tread plate comprising the foot support surface has a relatively fixed position and, in conjunction with the movable housing cover, only has a small stroke along the vertical direction of the pedal unit. Furthermore, the support surface for the driver's foot can be arranged directly on the surface of the tread plate or on a pedal pad applied to the tread plate. In addition, a support structure can be formed directly on the surface of the tread plate or on the pedal covering applied to the tread plate to provide better support for the driver's foot. The small stroke of the housing cover in the vertical direction of the pedal unit is preferably in the range of 1 mm to 5 mm.

The at least one sensor arrangement can comprise a movable measuring transducer and a sensor electronics means. In the present case, the term "sensor electronics means" is understood to mean an electric circuit or component comprising at least one sensor element, which can detect and process or evaluate magnetic, and/or inductive, and/or capacitive signals from the measuring transducer in a contactless manner. The sensor electronics means can comprise a printed circuit board and at least one electrical or electronic component arranged on the printed circuit board. The at least one component can, e.g., be what is referred to as an ASIC component or a microcontroller, which can include various functions for detecting and evaluating the sensor signals. However, it is also possible for the at least one component to be designed as an integrated circuit or as a discrete component. Software modules which are, e.g., provided on the microcontroller can also be used to evaluate and/or further process the detected signals. Also advantageous is a computer program product comprising program code stored on a machine-readable carrier, e.g., a semiconductor memory, a hard disk memory, or an optical memory and used in order to perform the evaluation when the program is executed.

Advantageous improvements to the pedal unit for controlling a vehicle function specified below are made possible by the measures and embodiments also specified below.

It is particularly advantageous that the at least one deflection device can comprise at least one actuating element coupled to the movable housing cover, which performs the stroke movement caused by the actuating force along the vertical direction of the pedal unit, and at least one slide coupled to the at least one actuating element, which is mounted for sliding movement and performs the measuring movement extending in the longitudinal direction of the pedal unit. The at least one actuating element can thereby act on the at least one slide directly or via a bracket spring. This enables a simple and cost-efficient implementation of the deflection device.

In one advantageous embodiment of the pedal unit, the at least one actuating element can move the at least one slide against the force of at least one return spring. The at least one return spring, which can, e.g., be designed as a mechanical spring element or as an elastic elastomer component, can always keep the at least one slide in contact with the at least one actuating element.

In a further advantageous embodiment of the pedal unit, the at least one actuating element can comprise a slanted surface, which can interact with an end region of the at least one slide facing the at least one actuating element to deflect the stroke movement of the at least one actuating element into the measuring movement of the at least one slide. The at least one actuating element acts as a wedge due to the slanted surface, which moves the at least one slide along the longitudinal direction of the pedal unit. The angle of the slanted surface or the wedge determines the horizontal path or the measuring movement along the longitudinal direction of the pedal unit. The actuation stroke or actuation path of the driver's foot, the resolution of the contactless measurement technology, and customer requirements can be combined thereby. Various angles can also be implemented when using multiple wedges and/or multiple actuating elements with slanted surfaces.

In an alternative advantageous embodiment of the pedal unit, the at least one bracket spring can be supported at one end on the sensor housing and at the other end on the at least one slide. In this case, the stroke movement of the at least one actuating element compresses the at least one bracket spring so that the at least one bracket spring displaces the at least one slide and performs the measurement movement in the longitudinal direction of the pedal unit. In this embodiment, the wedge for the movement deflection is replaced by one or more bracket springs, which convert the vertical or upward actuating movement or stroke movement of the pedal unit into a horizontal or longitudinal measuring movement of the pedal unit. In this embodiment, a return spring for the at least one slide can be omitted because the at least one bracket spring used could also retract the at least one slide upon release due to its spring effect.

In a further advantageous embodiment of the pedal unit, a separation wall can be arranged in the sensor housing, which can form a fluidically sealed chamber with the sensor housing. The fluidically sealed chamber can in this case be formed in a lower region of the sensor housing between a bottom of the sensor housing and the separation wall. Components in the fluidically sealed chamber can thus be protected from environmental influences. This is particularly advantageous if these components are moisture sensitive. In a housing concept with a separate bottom, the separation wall could be designed to be integral with the sensor housing. In other words, the separation wall is a rigid cast part of a sensor housing made of plastic or aluminum. The corresponding bottom can then be mounted in a sealed manner for this purpose. In a housing concept comprising an integrated bottom, the separation wall can be connected to the sensor housing in an interlocking, and/or frictional, and/or bonded manner. The separation wall can, e.g., be glued, welded, or heat caulked to the sensor housing. The integral design results in the advantage that the separation wall can be manufactured without an additional step in the assembly of the pedal unit. The interlocking, and/or frictional, and/or bonded connection can provide a particularly advantageous option for the flexible production of the separation wall, in particular its geometry.

In a further advantageous embodiment of the pedal unit, the separation wall can comprise at least one recess, in which the actuating element comprising the first slanted surface is at least partially receivable. However, the at least one recess should not comprise an opening between the fluidically sealed chamber and the remaining interior of the sensor housing.

In a further advantageous embodiment of the pedal unit, the at least one sensor arrangement can comprise a measuring transducer performing the measuring movement and a sensor electronics means, which is designed to detect the measuring movement of the measuring transducer in a contactless manner. Preferably, at least the sensor electronics means can be arranged in the fluidically sealed chamber.

In a further advantageous embodiment of the pedal unit, the at least one sensor electronics means can be arranged on a side of the separation wall facing away from the movable housing cover. As a result, sensitive and live components of the sensor electronics means are able to be protected from external environmental factors and moisture. Depending on the measuring principle being performed, the at least one sensor electronics means can, e.g., comprise a magnetic sensor, or a capacitive sensor, or inductive transmitter and receiver coils implemented in a printed circuit board.

In a further advantageous embodiment of the pedal unit, the measuring transducer can be connected to the at least one slide. In this case, the measuring transducer can, e.g., be designed as an inductive target or as a permanent magnet or as a capacitive plate, depending on the measuring principle being implemented. In other words, the at least one slide is designed to receive the corresponding measuring transducer in a task-oriented manner.

In a further advantageous embodiment of the pedal unit, the at least one slide can be guided in at least one slide guide, which is arranged on a top side of the separation wall facing the movable housing cover. The at least one slide guide can, e.g., be directly injected onto the separation wall. Alternatively, the at least one slide guide can also be mounted or fixed separately. The at least one slide guide can, e.g., be glued, clamped, heat caulked, screwed, etc. to the separation wall. In addition to plastic, slide guides made of metal are also suitable.

The elements or components of the pedal unit are always referred to as one or a plurality in the text hereinabove because multiple measuring principles can be implemented in parallel and/or redundantly for safety reasons.

The arrangement of multiple slides, return springs, bracket springs and actuating elements with mixed measuring principles, such as magnetic, inductive, capacitive, is easily possible to increase operational safety and can be varied to suit customer requirements. The measuring principles can thus be combined on one slide or distributed over multiple slides depending on how the safety principles are implemented. Accordingly, one actuating element or a plurality of actuating elements or one or more bracket springs for the movement deflection can be used. These can also have different geometries to modify the feed movement.

Exemplary embodiments of the disclosure are illustrated in the drawings and explained in more detail in the following description. In the drawings, identical reference signs refer to components or elements performing identical or similar functions.

DETAILED DESCRIPTION

Figure 1:
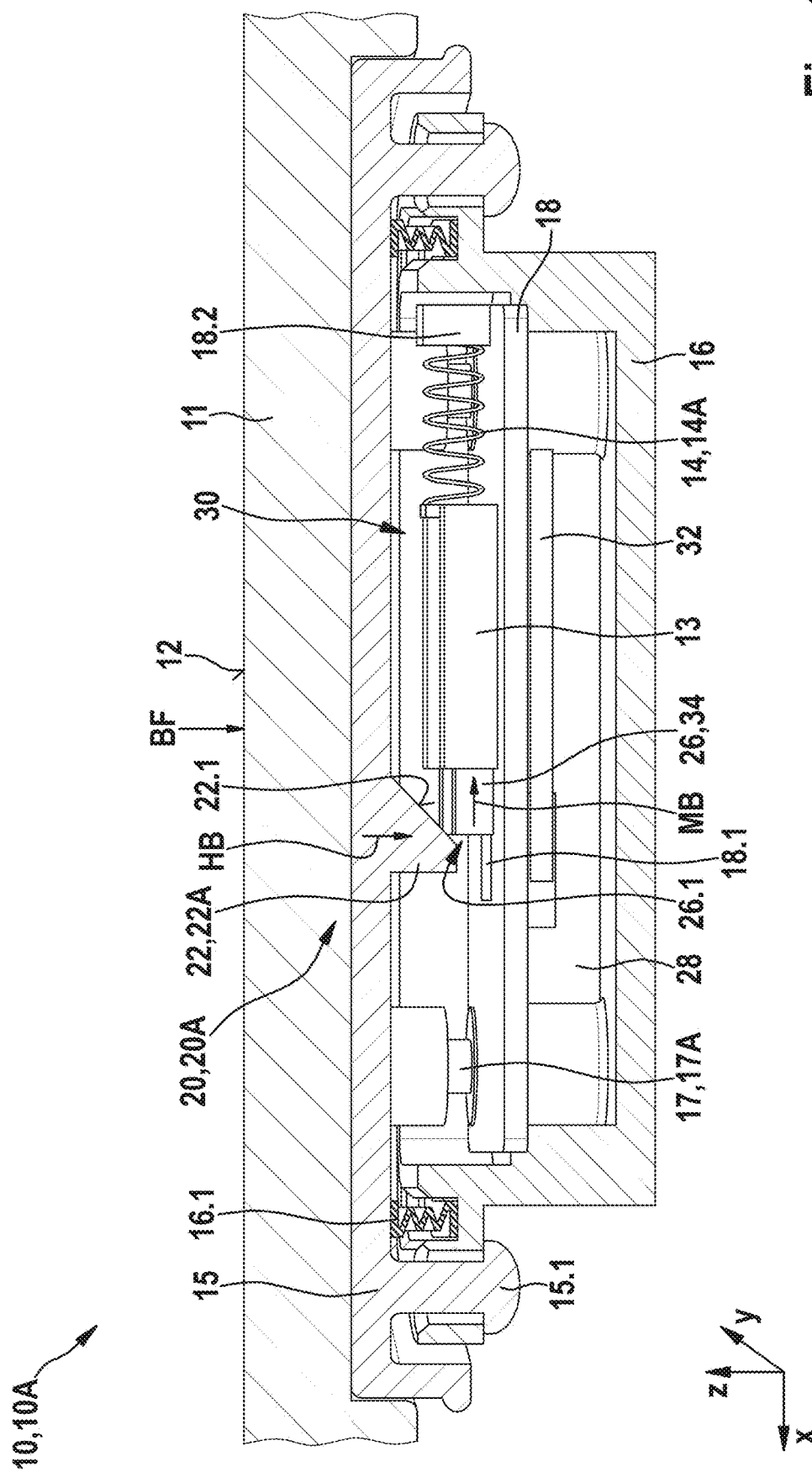
FIG. 1 shows a schematic perspective sectional view of a first exemplary embodiment of a pedal unit according to the disclosure for controlling a vehicle function.
Figure 2:
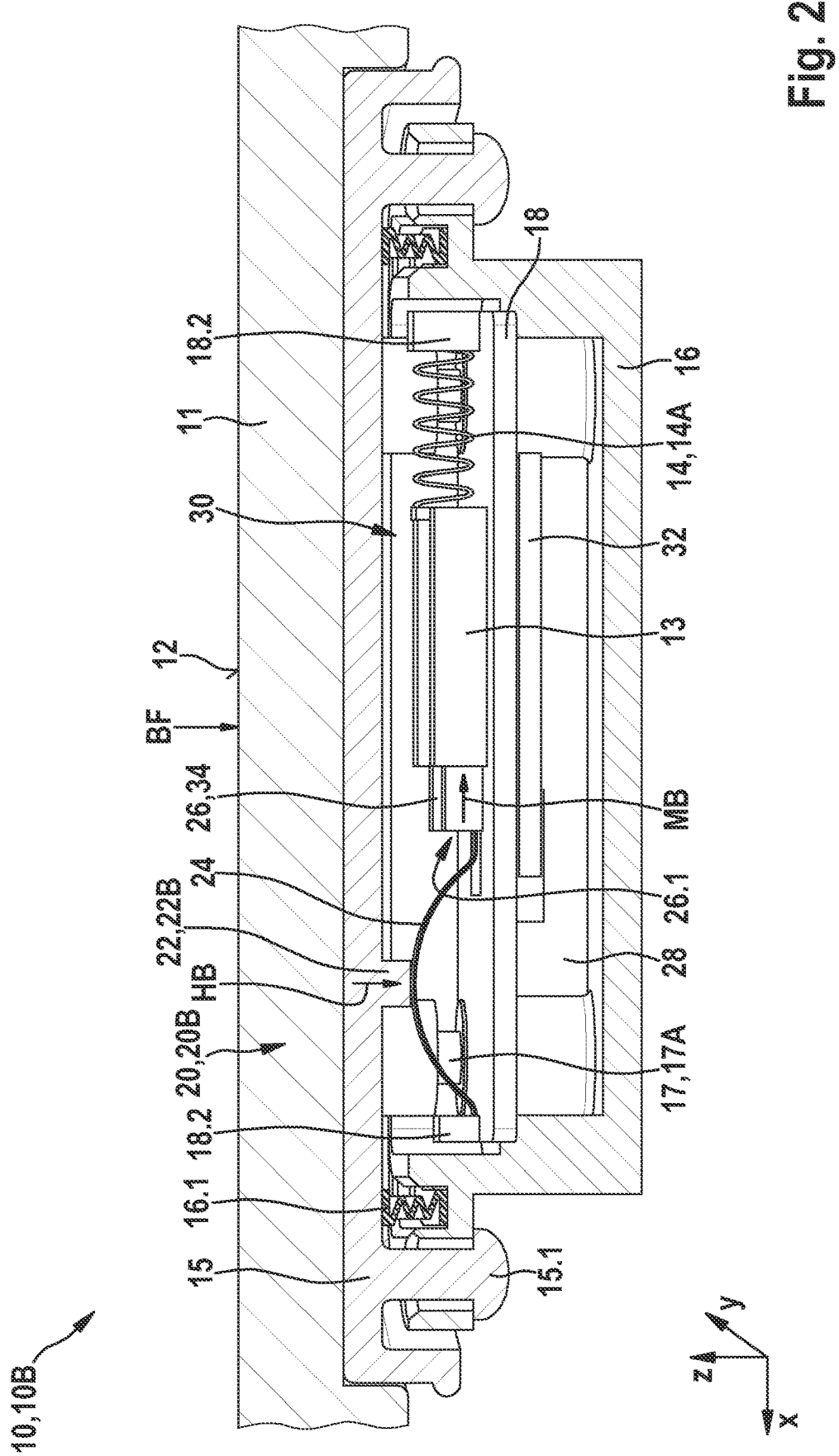
FIG. 2 shows a schematic perspective sectional view of a second exemplary embodiment of a pedal unit according to the disclosure for controlling a vehicle function.

As can be seen in FIGS. 1 and 2, the illustrated exemplary embodiments of a pedal unit 10, 10A, 10B according to the disclosure for controlling a vehicle function comprise a tread plate 11, which comprises a support surface 12 for receiving an actuating force BF of a driver's foot and is connected to a housing cover 15 that is movable via a small stroke along an vertical direction z of the pedal unit 10. The housing cover 15 that is movable via a small stroke is connected to a sensor housing 16 in which at least one sensor arrangement 30 is arranged. At least one deflection device 20, 20A, 20B deflects a small stroke movement HB of the movable housing cover 15 caused by the actuating force BF extending along the vertical direction z of the pedal unit 10, 10A, 10B into a measuring movement MB extending along a longitudinal direction x of the pedal unit 10, 10A, 10B. The at least one sensor arrangement 30 detects the measuring movement MB based on the small stroke movement HB in a contactless manner.

As can be seen further from FIGS. 1 and 2, the tread plate 11 in the illustrated exemplary embodiments does not comprise a pedal pad. In alternative embodiments of the pedal unit 10 (not shown), the tread plate 11 can comprise a support structure at the top to prevent the driver's foot from slipping. The support structure can be formed directly on a surface of the tread plate 11 or on a pedal pad applied to the tread plate 11.

As can be seen further from FIGS. 1 and 2, the stroke movement HB of the movable housing cover 15 is guided by a plurality of mushroom-shaped guide pins 15.1, which are formed on the movable housing cover 15. The mushroom-shaped guide pins 15.1 pass through corresponding openings, which are inserted in a web-shaped projection formed on the sensor housing 16. The mushroom-shaped guide pins 15.1 can prevent the movable housing cover 15 from lifting. In addition, in the illustrated exemplary embodiments, a circumferential bellows-like seal 16.1 is arranged between the movable housing cover 15 and the sensor housing 16 for sealing the enclosed interior outwardly in a circumferential sealing groove. As can be seen further from FIGS. 1 and 2, in the illustrated exemplary embodiments a plurality of return devices 17 is preferably arranged in corner areas of the sensor housing 16. The return devices 17 each comprise at least one spring-elastic return element 17A, which moves the movable housing cover 15 back to its initial position after actuation.

In the illustrated exemplary embodiments of the pedal unit 10, 10A, 10B, only one deflection device 20, 20A, 20B and only one sensor arrangement 30 are shown for clarity. For safety reasons, however, a plurality of deflection devices 20, 20A, 20B and a plurality of sensor assemblies 30 are used redundantly and/or in parallel in each exemplary embodiment of the pedal unit 10, 10A, 10B. To increase operational safety, the sensor arrangements 30 preferably implement various contactless measuring principles.

The illustrated exemplary embodiments each provide a pedal unit 10, 10A, 10B for controlling a vehicle function, which advantageously, by deflecting an actuating movement or stroke movement HB extending in the vertical direction z of the pedal unit 10, 10A, 10B into a measuring movement MB extending in the longitudinal direction x of the pedal unit 10, 10A, 10B MB, used non-contact measuring sensor arrangements 30 for measuring the small stroke movement of the tread plate 11 or the movable housing cover 15 coupled to the tread plate 11. Such a contactless path measurement can, e.g., be performed using a magnetic, inductive or even capacitive measuring principle. For this purpose, the sensor arrangement 30 comprises a corresponding measuring transducer 34, which is moved past a sensor electronics means 32, which comprises at least one sensor element and, e.g., senses, field changes, inductance changes, etc. The determined path can then be converted into an actuating force BF, e.g. in a control unit, which the driver exerts on a support surface 12 of the tread plate 11 when the pedal unit 10, 10A, 10B is actuated. Based on this actuating force BF, at least one control signal for the controllable vehicle function can then be determined or calculated. The controllable vehicle function is, e.g., a braking function or an acceleration function. In other words, the pedal unit 10, 10A, 10B, 10C is designed as a brake pedal or as an accelerator pedal.

As can further be seen from FIGS. 1 and 2, the deflection device 20, 20A, 20B in the illustrated exemplary embodiments comprises at least one actuating element 22 coupled to the movable housing cover 15, which performs the stroke movement HB caused by the actuation force BF along the vertical direction z of the pedal unit 10, and at least one slide 26 coupled to the at least one actuating element 22, which is mounted for sliding movement and performs the measuring movement MB extending in the longitudinal direction x of the pedal unit 10.

As can be seen further from FIGS. 1 and 2, a separation wall 18 is arranged in the sensor housing 16, which forms a fluidically sealed chamber 28 with the sensor housing 16. In the illustrated exemplary embodiments, the fluidically sealed chamber 28 is formed in a lower region of the sensor housing 16 between a bottom of the sensor housing 16 and the separation wall 18. In addition, the separation wall 18 is connected to the sensor housing 16 by means of an bonded connection (not shown in further detail). Of course, other suitable connection techniques can also be used to connect the separation wall 18 to the sensor housing 16.

In an alternative exemplary embodiment of the pedal unit 10 (not shown), a housing concept with a separate bottom is used for the sensor housing 16, in which the separation wall 18 is designed to be integral with the sensor housing 16.

As previously explained hereinabove, the sensor arrangement 30 comprises a measuring transducer 34 performing the measuring movement MB and a sensor electronics means 32 which detects the measuring movement MB of the measuring transducer 34 in a contactless manner.

As can be seen further in FIGS. 1 and 2, at least the sensor electronics means 34 of the sensor arrangement 30 are arranged in the fluidically sealed chamber 28. In the illustrated exemplary embodiments, the sensor electronics means 34 is arranged on a side facing away from the movable housing cover 15, in this case the bottom side of the separation wall 18.

As can be further seen from FIGS. 1 and 2, the measuring transducer 34 is connected to the corresponding slide 26 in the exemplary embodiments shown. Depending on the contactless measuring principle used, the measuring transducer 34 is designed as an inductive target or as a permanent magnet or as a capacitive plate. The slide 26 is guided in a slide guide 13, which is arranged on a top side of the separation wall 18 facing the movable housing cover 15. In the illustrated exemplary embodiments of the pedal units 10, 10A, 10B, the slide guides 13 are each injected directly onto the separation wall 18. Preferably, the separation wall 18 comprising the slide guides 13 is manufactured in a single or multi-component injection molding process.

In an alternative embodiment of the pedal unit 10 (not shown), the slide guide 13 is mounted or fixed separately on the separation wall 18. The slide guide 13 is, e.g., glued, clamped, heat-caulked, screwed, etc. to the separation wall 18. In addition to plastic, slide guides made of metal are also possible.

As can be further seen from FIG. 1, in the illustrated first exemplary embodiment of the pedal unit 10A, the illustrated actuating element 22 of the deflection device 20A acts directly on the corresponding slide 26. In this case, the actuating element 22 is designed as a wedge 22A with a slanted surface 22.1 and moves the corresponding slide 26 against the force of a return spring 14 designed as a coil spring 14A. The return spring 14 is supported at one end on a spring support block 18.2 arranged on the surface of the separation wall 18 facing the movable housing cover 15, and on the other end on the slide 26. In order to deflect the stroke movement HB of the actuating element 22 (which is designed as a wedge 22A) into the measuring movement MB of the slide 26, the slanted surface 22.1 interacts with an end region 26.1 of the slide 26 facing the actuating element 22. As can be seen further from FIG. 1, the separation wall 18 comprises a recess 18.1 in which the actuating element 22 designed as a wedge 22A and comprising the slanted surface 22.1. is at least partially receivable.

As can be further seen from FIG. 2, in the illustrated second exemplary embodiment of the pedal unit 10B, the illustrated actuating element 22 of the deflection device 20B acts directly on the corresponding slide 26 via a bracket spring 24. In this case, the actuating element 22 is designed as an actuating lug 22B and moves the corresponding slide 26 in a manner similar to the first exemplary embodiment of the pedal unit 10A, against the force of a return spring 14 designed as a coil spring 14A. The return spring 14 is supported at one end on a spring support block 18.2 arranged on the surface of the separation wall 18 facing the movable housing cover 15, and on the other end on the slide 26. As can be further seen in FIG. 2, the bracket spring 24 is supported at one end on the sensor housing 16 and at the other end on the slide 26 in order to deflect the stroke movement HB of the actuating element 22, which is designed as an actuating nose 22B. In this case, the stroke movement HB of the actuating element 22 compresses the bracket spring 24, so that the bracket spring 24 displaces the slide 26 and this performs the measuring movement MB in the longitudinal direction of the pedal unit 10.

In an alternative embodiment of the pedal unit 10 (not shown), the bracket spring 14 used is connected to the slide 26 at its end facing the latter, so that the bracket spring 14 can also retract the slide 26 when released due to the spring effect. In this exemplary embodiment, a return spring 14 for the slide 26 can then be omitted.

What is claimed is:

1. A pedal unit for controlling a vehicle function, comprising:
    a tread plate having a support surface configured to receive an actuating force of a driver's foot;
    a housing cover connected to the tread plate and movable via a small stroke movement along a vertical direction of the pedal unit;
    a sensor housing connected to the housing cover and having formed therein at least one sensor arrangement; and
    at least one deflection device designed to deflect a small the stroke movement of the housing cover extending along the vertical direction of the pedal unit caused by the actuating force into a measuring movement extending along a longitudinal direction of the pedal unit,
    wherein the at least one sensor arrangement is designed to detect the measuring movement based on the stroke movement in a contactless manner.

2. The pedal unit according to claim 1, wherein the at least one deflection device includes:
    at least one actuating element that is coupled to the housing cover and configured to perform the stroke movement caused by the actuating force along the vertical direction of the pedal unit, and
    at least one slide coupled to the at least one actuating element, the at least one slide being mounted for sliding movement and configured to perform the measuring movement extending in the longitudinal direction of the pedal unit.

3. The pedal unit according to claim 2, wherein the at least one actuating element is configured and arranged to act on the at least one slide directly or via a bracket spring.

4. The pedal unit according to claim 3, wherein:
    the bracket spring is supported at one end on the sensor housing and at the other end on the at least one slide, and
    the stroke movement of the at least one actuating element compresses the bracket spring such that the at least one bracket spring displaces the at least one slide, and the at least one slide performs the measuring movement in the longitudinal direction of the pedal unit.

5. The pedal unit according to claim 2, wherein:
    the at least one deflection device further includes at least one return spring, and
    the at least one actuating element is configured to move the at least one slide against the force of the at least one return spring.

6. The pedal unit according to claim 2, wherein the at least one actuating element includes a slanted surface which is configured to interact with an end region of the at least one slide facing the at least one actuating element in order to deflect the stroke movement of the at least one actuating element into the measuring movement of the at least one slide.

7. The pedal unit according claim 2, wherein a separation wall is arranged in the sensor housing so as to form, along with the sensor housing, a fluidically sealed chamber.

8. The pedal unit according to claim 7, wherein the separation wall includes at least one recess in which the at least one actuating element is at least partially received.

9. The pedal unit according to claim 7, wherein the at least one sensor arrangement includes (i) a measuring transducer configured to perform the measuring movement, and (ii) at least one sensor electronics mechanism which is designed to detect the measuring movement of the measuring transducer in a contactless manner.

10. The pedal unit according to claim 9, wherein;
the at least one sensor electronics mechanism is arranged in the fluidically sealed chamber.

11. The pedal unit according to claim 10, wherein the at least one sensor electronics mechanism is arranged on a side of the separation wall facing away from the housing cover.

12. The pedal unit according to claim 9, wherein the measuring transducer is connected to the at least one slide.

13. The pedal unit according to claim 9, wherein the measuring transducer is designed as an inductive target, or as a permanent magnet, or as a capacitive plate.

14. The pedal unit according to claim 7, wherein the at least one slide is guided in a slide guide which is arranged on a top side of the separation wall facing the housing cover.

15. The pedal unit according to claim 1, wherein the vehicle function is a braking function or an acceleration function.

16. The pedal unit according to claim 1, wherein the stroke movement of the housing cover in the vertical direction is a small stroke that is in a range of from 1 mm to 5 mm.

* * * * *